United States Patent
Shikata

(10) Patent No.: US 8,250,504 B2
(45) Date of Patent: Aug. 21, 2012

(54) DESIGNING METHOD OF SEMICONDUCTOR INTEGRATED CIRCUIT

(75) Inventor: Takashi Shikata, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 278 days.

(21) Appl. No.: 12/556,649

(22) Filed: Sep. 10, 2009

(65) Prior Publication Data

US 2010/0005439 A1    Jan. 7, 2010

Related U.S. Application Data

(63) Continuation of application No. PCT/JP2007/056381, filed on Mar. 27, 2007.

(51) Int. Cl.
*G06F 17/50* (2006.01)

(52) U.S. Cl. ......... 716/104; 716/100; 716/101; 716/116

(58) Field of Classification Search .................. 716/100, 716/101, 104, 116, 117
See application file for complete search history.

(56) References Cited

U.S. PATENT DOCUMENTS

| | | | | |
|---|---|---|---|---|
| 4,217,618 A | * | 8/1980 | Kellenbenz et al. | 361/56 |
| 5,051,572 A | * | 9/1991 | Joseph et al. | 250/207 |
| 7,112,773 B2 | * | 9/2006 | Thompson | 250/207 |
| 2009/0315399 A1 | * | 12/2009 | Shikata | 307/38 |

FOREIGN PATENT DOCUMENTS

| | | |
|---|---|---|
| JP | 2006-031408 A | 2/2006 |
| JP | 2006-209162 A | 8/2006 |

* cited by examiner

*Primary Examiner* — Sun Lin
(74) *Attorney, Agent, or Firm* — Fujitsu Patent Center

(57) ABSTRACT

A designing method of a semiconductor integrated circuit is provided, the method including a preparation step of preparing first design data having a power gating circuit for supplying a power supply voltage to a logic circuit according to a power gating control signal and a first clamp circuit for clamping an output signal from the logic circuit according to a clamp control signal; and a generation step of generating, in order to verify the first design data, second design data in which a first mask circuit for masking the output signal from the logic circuit according to the power gating control signal is added in place of the power gating circuit to the first design data.

20 Claims, 10 Drawing Sheets

F I G. 1
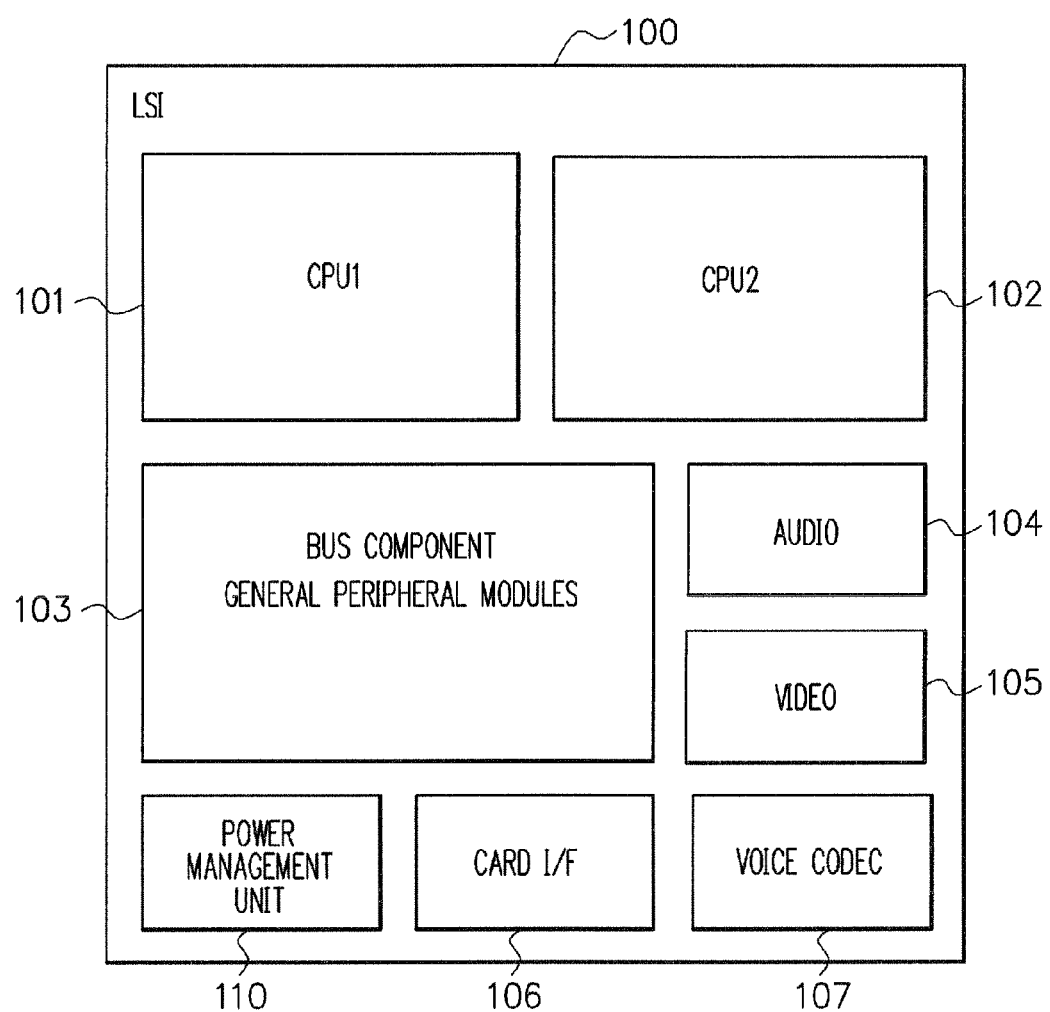

F I G. 14
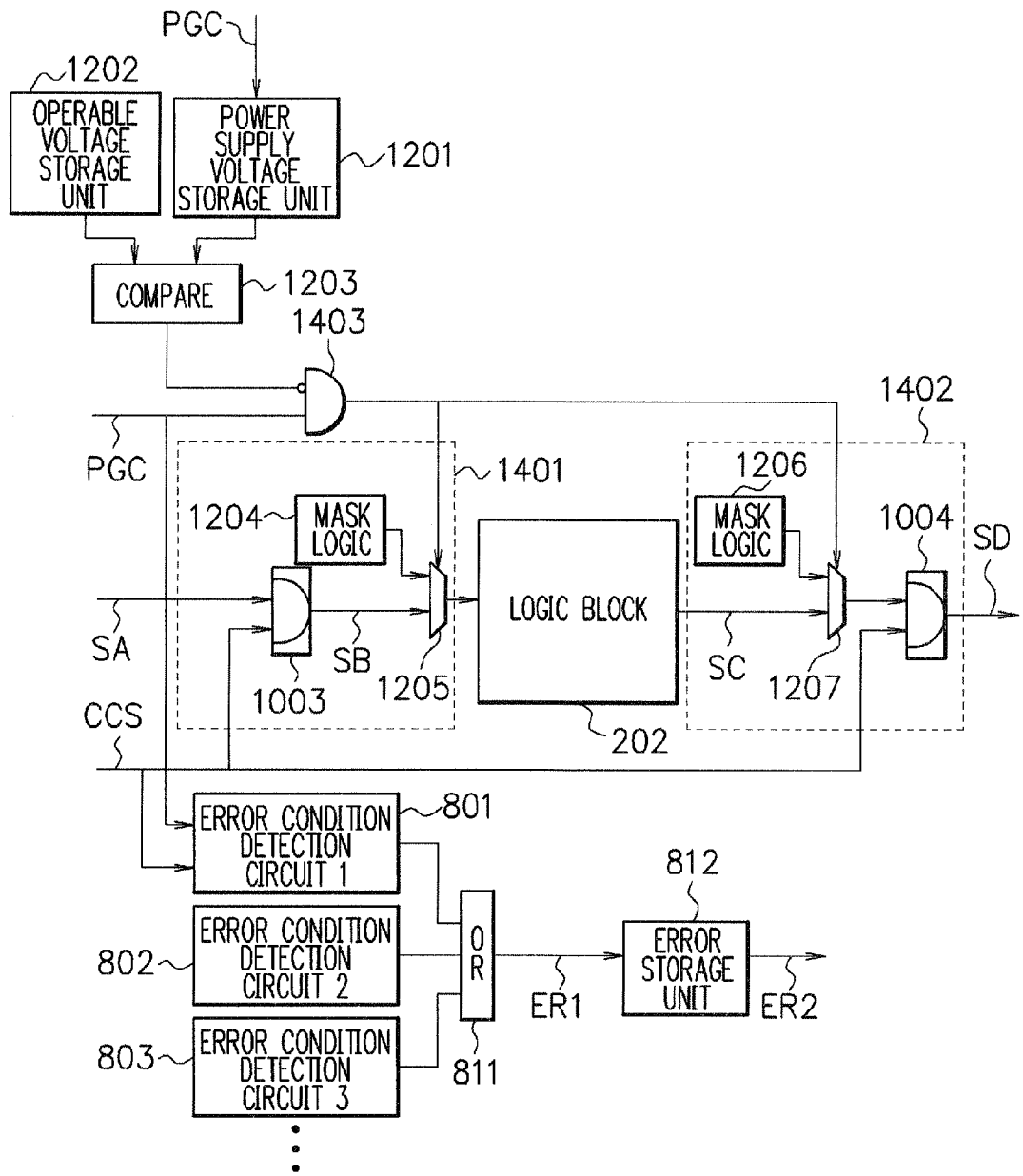

F I G. 17
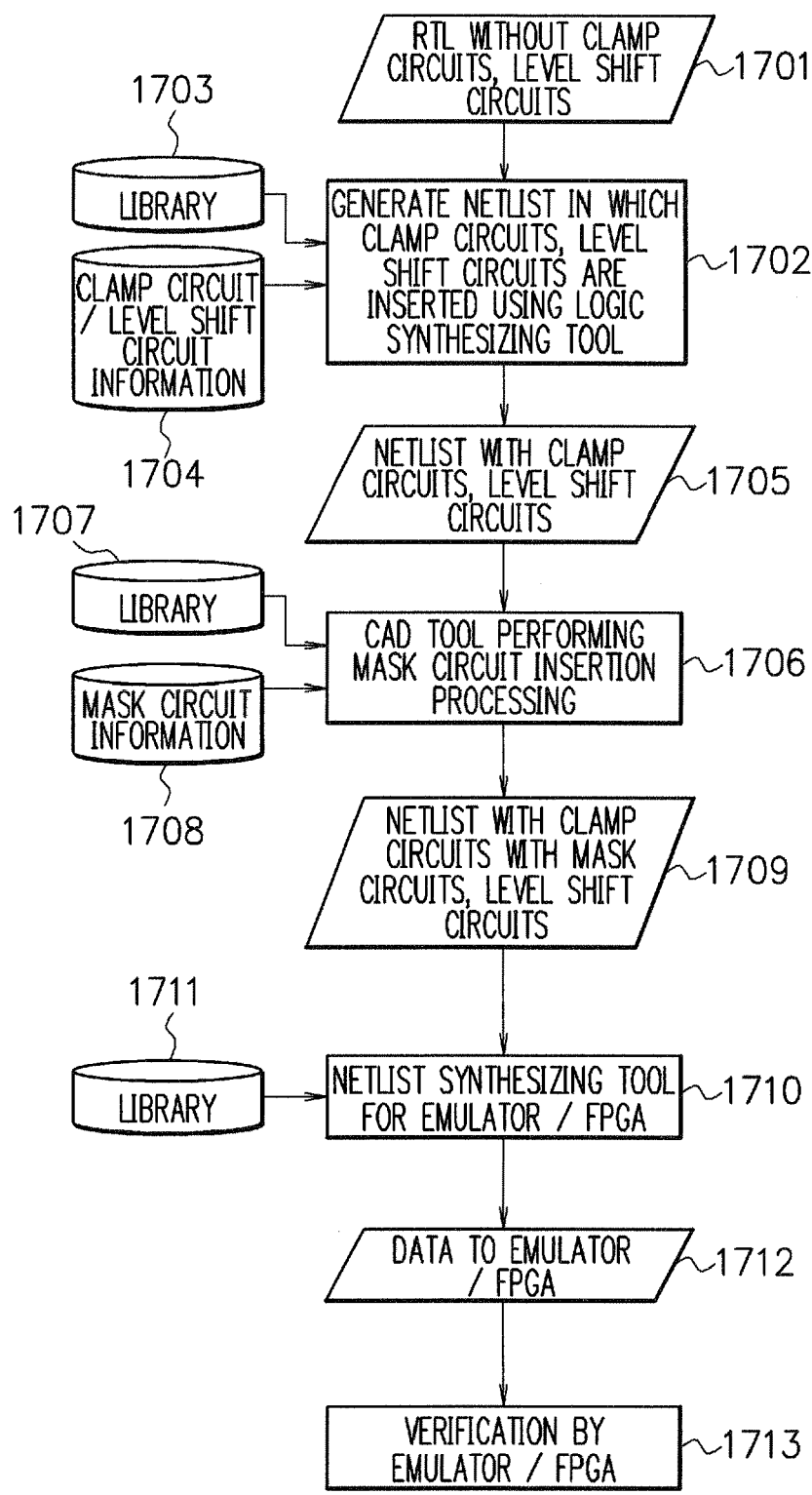

DESIGNING METHOD OF SEMICONDUCTOR INTEGRATED CIRCUIT

CROSS-REFERENCE TO RELATED APPLICATIONS

This application is a Continuation of International Application No. PCT/JP2007/056381, with an international filing date of Mar. 27, 2007, which designating the United States of America, the entire contents of which are incorporated herein by reference.

FIELD

The present invention relates to a designing method of a semiconductor integrated circuit and, more specifically, to a designing method of generating design data for verifying power supply control of an LSI divided into a plurality of power supply blocks using a hardware emulator or FPGA.

BACKGROUND

In recent years, an LSI (semiconductor integrated circuit) divided into a plurality of power supply blocks has been developed. By performing ON/OFF control of power supply or DVFS (Dynamic Voltage and Frequency Scaling) control of a specific power supply block, the power consumption of the LSI can be reduced. The DVFS control dynamically controls the power supply voltage and the operating frequency.

However, poor conditions of products associated with a change in the power supply voltage or the ON/OFF control of the power supply voltage frequently happen, and therefore enhancement of a verification technique is desired. It has been known that most of failures in the LSI are often caused by the operation composed of complicated operations of both software and hardware.

At present, however, the verification about the power supply management control is usually performed by a software simulator, in which case there is a problem that debugging of software such as an actual power supply management application or the like cannot be appropriately performed in terms of simulation execution time.

Therefore, a technique becomes necessary which verifies the power supply management control by a hardware emulator or FPGA (Field Programmable Gate Array) capable of verification at a higher speed than simulation. An existing hardware emulator is composed of an FPGA and a dedicated processor and cannot perform ON/OFF of the power supply voltage and dynamic change of the power supply voltage of a specific logic block, in which there is a problem that a high-speed verification technique for the power supply management control by the hardware emulator or FPGA has not been established.

Japanese Laid-open Patent Publication No. 2006-31408 discloses a verification technique by an emulator to solve such problems. However, this is based on the assumption that there is an emulator which can monitor the power supply voltage and is not considered to be a direct solution unless such emulator and FPGA exist at present.

SUMMARY

According to an aspect of the embodiment, a designing method of a semiconductor integrated circuit includes: a preparation step of preparing first design data having a power gating circuit for supplying a power supply voltage to a logic circuit according to a power gating control signal and a first clamp circuit for clamping an output signal from the logic circuit according to a clamp control signal; and a generation step of generating, in order to verify the first design data, second design data in which a first mask circuit for masking the output signal from the logic circuit according to the power gating control signal is added in place of the power gating circuit to the first design data.

According to an another aspect of the embodiment, a designing method of a semiconductor integrated circuit includes: a preparation step of preparing first design data having a power gating circuit for supplying a power supply voltage to a logic circuit according to a power gating control signal and a first clamp circuit for clamping an output signal from the logic circuit according to a clamp control signal; and a generation step of generating, in order to verify the first design data, second design data in which an error detection circuit for detecting an error based on the power gating control signal and the clamp control signal is added to the first design data.

According to an other aspect of the embodiment, a designing method of a semiconductor integrated circuit includes: a preparation step of preparing first design data having a power gating circuit for controlling a value of a power supply voltage to be supplied to a logic circuit according to a power gating control signal and a first level shift circuit outputting a signal at a level different from a level of an output signal from the logic circuit by shifting the level of the output signal from the logic circuit; and a generation step of generating, in order to verify the first design data, second design data in which a comparison circuit for comparing whether or not the power supply voltage value according to the power gating control signal is an operable voltage and a first mask circuit for masking the output signal from the logic circuit according to a comparison result of the comparison circuit are added in place of the power gating circuit to the first design data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating a configuration example of an LSI designed by a designing method of a semiconductor integrated circuit of a first embodiment;

FIG. 14 is a circuit diagram illustrating a configuration example of a circuit block according to a fourth embodiment;

FIG. 17 is a flowchart illustrating another processing example of a program to be executed by the computer in FIG. 15.

DESCRIPTION OF EMBODIMENTS (First Embodiment)

Figure 2:
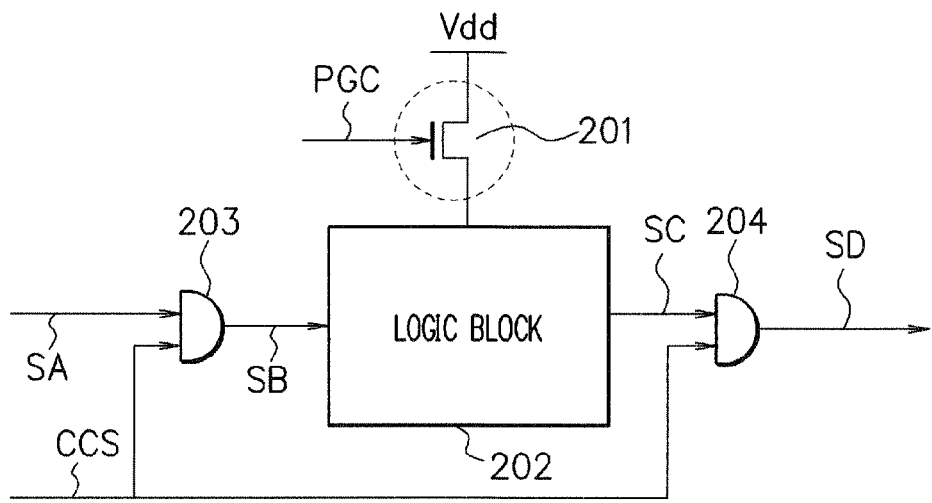
FIG. 2 is a circuit diagram illustrating a configuration example of each of the circuit blocks in FIG. 1.

FIG. 1 is a block diagram illustrating a configuration example of an LSI (Large Scale Integrated Circuit) 100 designed by a designing method of a semiconductor integrated circuit of a first embodiment. The LSI 100 includes a first CPU (Central Processing Unit) 101, a second CPU 102, a bus component or peripheral module 103, an audio circuit 104, a video circuit 105, a card interface 106, a voice codec circuit 107 and a power supply management (power management) unit 110. The bus component or peripheral module 103 is an On-Chip Bus (OCB), a memory controller, a clock generator or the like. The circuit blocks 101 to 107 each have a logic circuit. The power supply management unit 110 can control ON/OFF of the power supply voltage for each of the circuit blocks 101 to 107 and conduct DVFS (Dynamic Voltage and Frequency Scaling) control for each of the CPUs 101 and 102, thereby reducing the power consumption of the LSI 100. The DVFS control dynamically controls the power supply voltage and the operating frequency.

FIG. 2 is a circuit diagram illustrating a configuration example of each of the circuit blocks 101 to 107 in FIG. 1. The power supply management unit 110 outputs a power gating control signal PGC and a clamp control signal CCS to each of the circuit blocks 101 to 107. A power gating circuit (cell) 201 is an n-channel field effect transistor having a gate connected to the power gating control signal PGC, a drain connected to a power supply voltage Vdd, and a source connected to a logic circuit (logic block) 202. The power gating circuit 201 supplies the power supply voltage to the logic circuit 202 according to the power gating control signal PGC. Note that the power gating circuit 201 may be composed of a p-channel field effect transistor.

A clamp circuit (cell) 203 clamps a logic signal SA according to the clamp control signal CCS and outputs a logic signal SB to the logic circuit 202. Specifically, the clamp circuit 203 includes a logical product (AND) circuit which outputs a logical product signal SB of the logic signal SA and the clamp control signal CCS to the logic circuit 202.

A clamp circuit (cell) 204 clamps an output logic signal SC from the logic circuit 202 according to the clamp control signal CCS and outputs a logic signal SD. Specifically, the clamp circuit 204 outputs a logical product signal SD of the output logic signal SC from the logic circuit 202 and the clamp control signal CCS.

Figure 3:
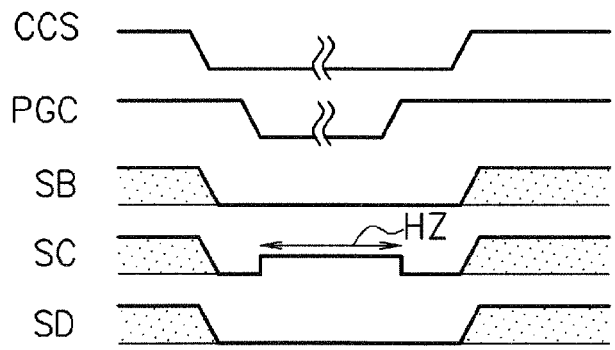
FIG. 3 is a timing chart for explaining a normal operation of the circuit block in FIG. 2.

FIG. 3 is a timing chart for explaining the normal operation of the circuit block in FIG. 2. When the power gating control signal PGC becomes high level, the power gating circuit 201 is turned on so that the power supply voltage Vdd is supplied to the logic circuit 202 to make the logic circuit 202 operable. In contrast, when the power gating control signal PGC becomes low level, the power gating circuit 201 is turned off so that the power supply voltage Vdd is not supplied to the logic circuit 202 to bring the logic circuit 202 into an operation stop state, whereby the power consumption can be reduced.

The clamp control signal CCS is controlled according to the power gating control signal PGC. Initially, the clamp control signal CCS and the power gating control signal PGC are at high level.

First, a case of controlling the power supply voltage from ON to OFF will be described. The clamp control signal CCS is first changed from high level to low level, and the power gating control signal PGC is then changed from high level to low level.

Next, a case of controlling the power supply voltage from OFF to ON will be described. The power gating control signal PGC is first changed from low level to high level, and the clamp control signal CCS is then changed from low level to high level.

The logic signal SB becomes low level when the clamp control signal CCS is at low level, and becomes the same signal as the logic signal SA when the clamp control signal CCS is at high level.

Since the power supply voltage Vdd is not supplied to the logic circuit 202 when the power gating control signal PGC is at low level, the logic signal SC becomes a high impedance state HZ.

The logic signal SD becomes low level when the clamp control signal CCS is at low level, and becomes the same signal as the logic signal SC when the clamp control signal CCS is at high level. When the logic signal SC is in the high impedance state HZ, the clamp control signal CCS is at low level, so that the logic signal SD does not become the high impedance state HZ but is clamped at low level. In other words, the logic signal SC is clamped according to the clamp control signal CCS, whereby the high impedance state HZ of the logic signal SC is not propagated to the logic signal SD at the subsequent stage.

As described above, in turning off the power supply to the circuit block, the clamp circuits 203 and 204 clamp the input signal SA and the output signal SC before the power supply is turned off, and then the power supply is turned off. On the other hand, in bringing the power OFF state to the power ON state, by the inverse procedure, the power supply is turned on first, and then the clamping by the clamp circuits 203 and 204 is released. This ensures that when the power supply to the logic circuit 202 is off, a malfunction and an unintended flow of leak current due to propagation of an unknown value of the high impedance state (an intermediate potential or 0 V) HZ outputted from the circuit block can be prevented. Note that in the case where the logic circuit 202 is composed of a CMOS and all of input signals are received by an ordinary buffer, inverter or the like, there is no problem if the clamp circuit 203 clamping the logic signal SA is omitted. Further, the clamp circuits 203 and 204 are not limited to AND circuits but may be logical sum (OR) circuits or latch circuits.

Figure 4:
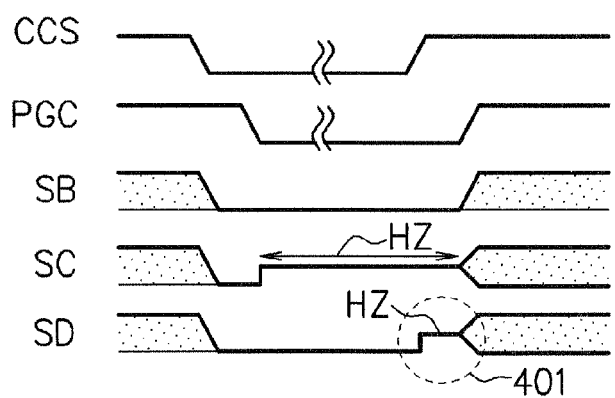
FIG. 4 is a timing chart for explaining a malfunction of the circuit block in FIG. 2.

FIG. 4 is a timing chart for explaining a malfunction of the circuit block in FIG. 2, illustrating a failure case occurring when there is an incorrect relation between the clamp control signal CCS and the power gating control signal PGC in ON/OFF controlling the power supply to the circuit block. Essentially, it is necessary that, as illustrated in FIG. 3, after the power gating control signal PGC is changed from low level to high level, the clamp control signal CCS is changed from low level to high level. A case will be described in which, however, the clamp control signal CCS is accidentally changed from low level to high level before the power gating control signal PGC is changed from low level to high level as illustrated in FIG. 4. The logic signal SC becomes the high impedance state HZ when the power gating control signal PGC is at low level. Here, at a timing 401 of the logic signal SD, the logic signal SC is in the high impedance state HZ and the clamp control signal CCS is at high level, so that the logic signal SD becomes the high impedance state HZ. Propagation of the high impedance state HZ to the logic signal SD causes the circuit at the subsequent stage using the logic signal SD to malfunction.

As described above, in bringing the power OFF state to the power ON state, if the clamping by the clamp circuits 203 and 204 is released before the power is turned on due to a circuit error or an error by software, a failure will occur in which a signal in the high impedance state HZ (an intermediate potential or 0 V) appearing in the logic signal SD propagates to cause a malfunction.

However, such a high impedance state HZ cannot be expressed by the hardware emulator and FPGA, leading to a problem that the malfunction by such a signal cannot be detected by the hardware emulator or FPGA.

Figure 5:
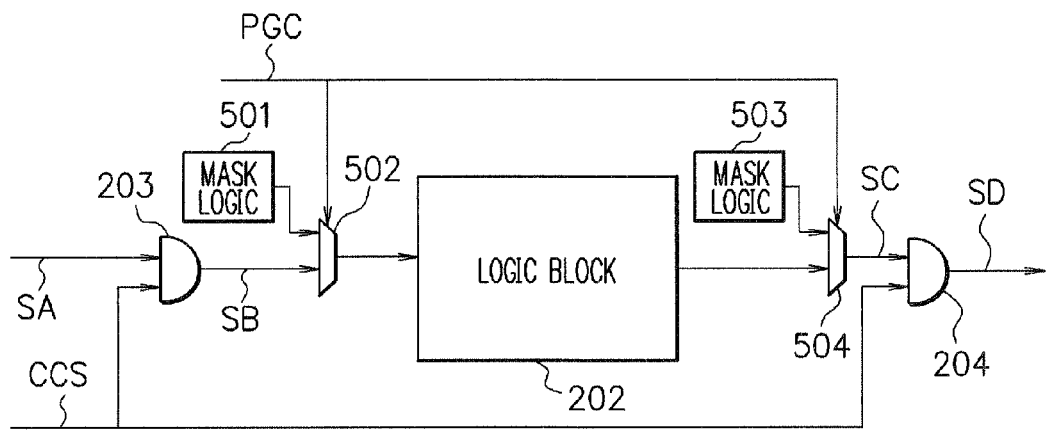
FIG. 5 is a circuit diagram illustrating a configuration example of a circuit block made by modifying the circuit block in FIG. 2 in order to enable verification by a hardware emulator or FPGA.

FIG. 5 is a circuit diagram illustrating a configuration example of a circuit block made by modifying the circuit block in FIG. 2 in order to enable verification by the hardware emulator or FPGA. FIG. 5 is made by omitting the power gating circuit 201 and adding mask logic circuits 501 and 503 and selectors 502 and 504 in place of the power gating circuit 201 with respect to the circuit block in FIG. 2. Hereinafter, points that FIG. 5 is different from FIG. 2 will be described. The mask logic circuits 501 and 503 output, for example, mask data fixed at high level.

The selector 502 selects the mask data outputted from the mask logic circuit 501 or the logic signal SB outputted from the clamp circuit 203 according to the power gating control signal PGC and outputs it to the logic circuit 202. In short, the selector 502 is a mask circuit for masking the input signal to the logic circuit 202 according to the power gating control signal PGC.

The selector 504 selects the mask data outputted from the mask logic circuit 503 or the logic signal outputted from the logic circuit 202 according to the power gating control signal PGC and outputs it as the logic signal SC to the clamp circuit 204. In short, the selector 504 is a mask circuit for masking the output signal from the logic circuit 202 according to the power gating control signal PGC.

Figure 6:
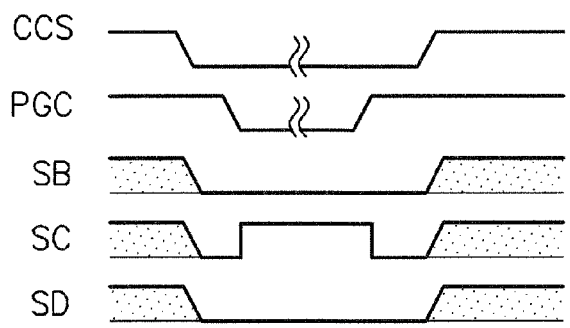
FIG. 6 is a timing chart for explaining a normal operation of the circuit block in FIG. 5.

FIG. 6 is a timing chart for explaining the normal operation of the circuit block in FIG. 5. The selector 502 selects the output logic signal SB from the clamp circuit 203 when the power gating control signal PGC is at high level or selects the output mask data (for example, high level) from the mask logic circuit 501 when the power gating control signal PGC is at low level, and outputs it to the logic circuit 202. The selector 504 selects the output logic signal from the logic circuit 202 when the power gating control signal PGC is at high level or selects the output mask data (for example, high level) from the mask logic circuit 503 when the power gating control signal PGC is at low level, and outputs it to the clamp circuit 204.

The clamp control signal CCS, the power gating control signal PGC and the logic signal SB are the same as those in FIG. 3.

The logic signal SC is the same signal as the output logic signal from the logic circuit 202 when the power gating control signal PGC is at high level and is the same signal as the mask data (for example, high level) when the power gating control signal PGC is at low level. In other words, the high impedance state HZ in FIG. 3 is expressed as the mask data (for example, high level) in FIG. 6.

The logic signal SD becomes low level when the clamp control signal CCS is at low level and is the same signal as the logic signal SC when the clamp control signal CCS is at high level. When the logic signal SC is the mask data (for example, high level), the clamp control signal CCS is at low level, so that the logic signal SD does not become the mask data (for example, high level) but is clamped at low level. In other words, the logic signal SC is clamped according to the clamp control signal CCS, whereby the mask data (for example, high level) of the logic signal SC is not propagated to the logic signal SD at the subsequent stage.

Figure 7:
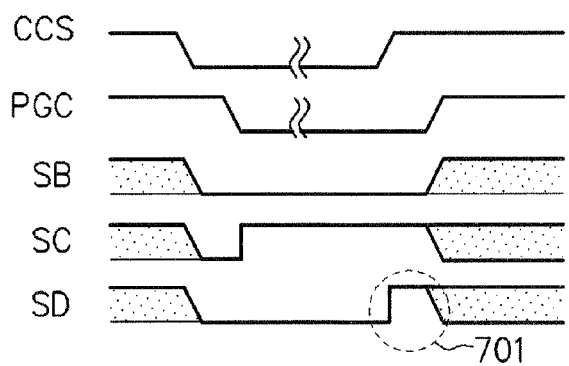
FIG. 7 is a timing chart for explaining a malfunction of the circuit block in FIG. 5.

FIG. 7 is a timing chart for explaining a malfunction of the circuit block in FIG. 5, illustrating a failure case occurring when there is an incorrect relation between the clamp control signal CCS and the power gating control signal PGC in ON/OFF controlling the power supply to the circuit block. The clamp control signal CCS, the power gating control signal PGC and the logic signal SB are the same as those in FIG. 4.

The logic signal SC becomes the mask data (for example, high level) when the power gating control signal PGC is at low level, and becomes the same signal as the output logic signal from the logic circuit 202 when the power gating control signal PGC is at high level.

At a timing 701 of the logic signal SD, since the logic signal SC is the mask data (for example, high level) and the clamp control signal CCS is at high level, the logic signal SD becomes the same signal as the mask data (for example, high level). By detecting this state by the hardware emulator or FPGA, a malfunction (design error) of the circuit block can be detected.

As described above, since the power gating circuit 201 in FIG. 2 cannot be actually realized by the hardware emulator and FPGA, the power cut-off (OFF) state of the logic circuit 202 is simulated by masking the output signal (or input/output signal) from the logic circuit 202 by the mask data with a specific value. The selectors 502 and 504 select to allow the input/output signal to/from the logic circuit 202 to pass as it is or to take the value masked by the mask data according to the power gating control signal PGC. At the power cut-off, the value masked by the mask data is selected. As a matter of course, it is also possible that the power gating control signal PGC is used not as a select signal but directly as the mask data. Thus, if there is a control error in the clamp control signal CCS as illustrated in FIG. 7, not the output signal from the logic circuit 202 but the mask data is outputted as the logic signal SC, so that the malfunction can be detected also by the hardware emulator or FPGA.

Note that the mask circuit (including the mask logic circuit 501 and the selector 502) on the side of the input signal to the logic circuit 202 can be omitted. Besides, the mask data outputted from the mask logic circuits 501 and 503 are not limited to high level but may be low level or a specific variable value.

According to this embodiment, by generating the design data of the circuit block for verification, the operation in ON/OFF control of the power supply voltage can be verified.

Further, the verification can be performed by the hardware emulator or FPGA, so that high-speed verification is possible.

(Second Embodiment)

Figure 8:
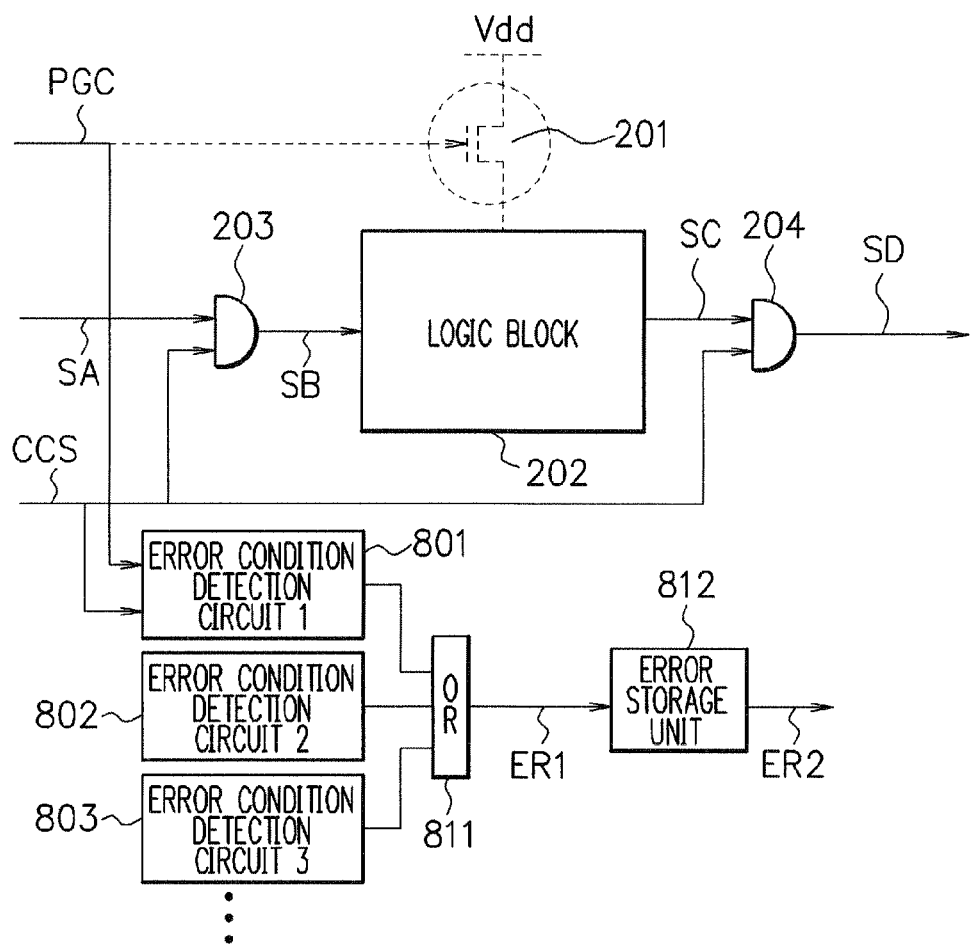
FIG. 8 is a circuit diagram illustrating a configuration example of a circuit block according to a second embodiment.

FIG. 8 is a circuit diagram illustrating a configuration example of a circuit block according to a second embodiment, and illustrating a configuration example of a circuit block made by modifying the circuit block in FIG. 2 in order to enable verification by the hardware emulator or FPGA. FIG. 8 is made by omitting the power gating circuit 201 and adding error condition detection circuits 801 to 803, a logical sum (OR) circuit 811 and an error storage unit 812 in place of the power gating circuit 201 with respect to the circuit block in FIG. 2. Hereinafter, points that FIG. 8 is different from FIG. 2 will be described.

The first error condition detection circuit 801 detects and outputs an error when a first error condition is satisfied, based on the power gating control signal PGC and the clamp control signal CCS. The second error condition detection circuit 802 detects and outputs an error when a second error condition is satisfied. The third error condition detection circuit 803 detects and outputs an error when a third error condition is satisfied. The OR circuit 811 outputs a logical sum signal of the output signals from the error condition detection circuits 801 to 803 to the error storage unit 812 as an error detection signal ER1. When the error detection signal ER1 becomes high level representing an error, the error storage unit 812 holds the error state as high level and outputs an error detection signal ER2.

Figure 9:
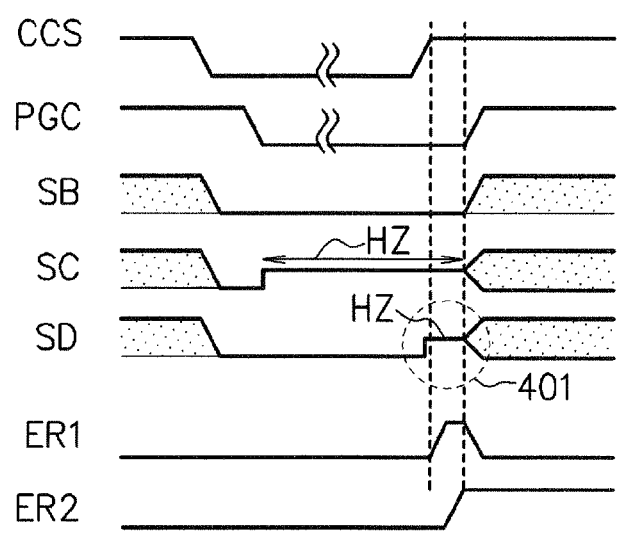
FIG. 9 is a timing chart for explaining a malfunction of the circuit block in FIG. 8.

FIG. 9 is a timing chart for explaining a malfunction of the circuit block in FIG. 8, illustrating a failure case occurring when there is an incorrect relation between the clamp control signal CCS and the power gating control signal PGC in ON/OFF controlling the power supply to the circuit block. The clamp control signal CCS, the power gating control signal PGC and the logic signals SB, SC and SD are the same as those in FIG. 4.

The first error condition detection circuit 801 detects an error based on the power gating control signal PGC and the clamp control signal CCS. Specifically, the first error condition detection circuit 801 detects an error when the clamp control signal CCS is at high level and the power gating control signal PGC is at low level as at the timing 401, and outputs high level, but otherwise outputs low level. The output signal from the first error condition detection circuit 801 becomes the error detection signal ER1. The error detection signal ER2 has an initial state at low level and becomes and keeps high level representing the error state once the error detection signal ER1 becomes high level.

As described above, this embodiment is made by leaving the logic configurations of the clamp circuits 203 and 204 and the logic circuit 202 in FIG. 2 as they are and adding the error condition detection circuits 801 to 803 using specific control signals such as the power gating control signal PGC, the clamp control signal CCS and so on. The error condition detection circuits 801 to 803 can be circuits detecting a condition under which the circuit block potentially causes a malfunction. For example, the error condition detection circuit 801 detects, as an error, a condition that the clamp control signal CCS is at high level and the power gating control signal PGC is at low level. Then, in the case where there are a plurality of error condition detection circuits 801 to 803, they are configured such that their detection results can be individually held or the error detection signal ER1 summarized by the OR circuit 811 can be held in the error storage unit 812 so that occurrence of an error can be verified afterward.

The error condition detection circuits 801 to 803 and the error storage unit 812 may be provided in advance in circuitry as a redundant test circuit or may be transplanted into the hardware emulator or FPGA and added in verification. Further, a method of reading the result of the error storage unit 812 may be configured such that the result can be read out by the CPU or the like via the bus in the semiconductor chip or an interface signal for reading out the error result is added when the result is compiled for the hardware emulator or FPGA.

According to this embodiment, by generating the design data of the circuit block for verification, the operation in ON/OFF control of the power supply voltage can be verified. Further, the verification can be performed by the hardware emulator or FPGA, so that high-speed verification is possible.

(Third Embodiment)

Figure 10:
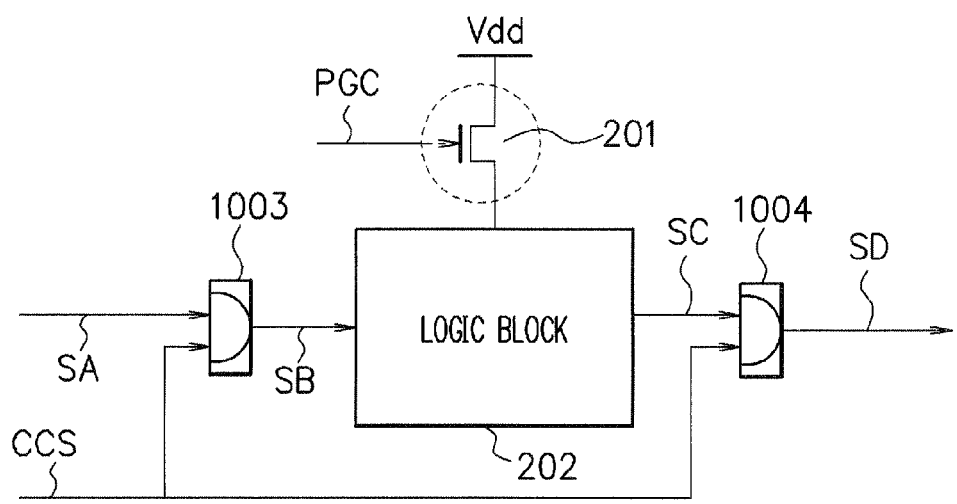
FIG. 10 is a circuit diagram illustrating a configuration example of each of circuit blocks according to a third embodiment.
Figure 11:
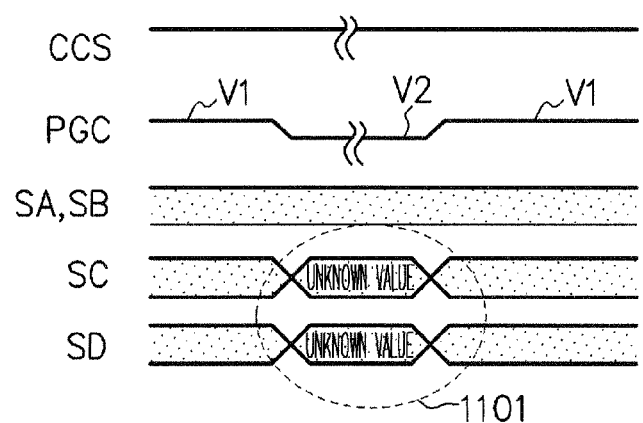
FIG. 11 is a timing chart for explaining a malfunction of the circuit block in FIG. 10.

FIG. 10 is a circuit diagram illustrating a configuration example of each of the circuit blocks 101 to 107 (FIG. 1) according to a third embodiment, and FIG. 11 is a timing chart for explaining a malfunction of the circuit block in FIG. 10. FIG. 10 is made by providing clamp circuits 1003 and 1004 with level shift function in place of the clamp circuits 203 and 204 with respect to FIG. 2. Hereinafter, points that FIG. 10 is different from FIG. 2 will be described.

The power gating circuit 201 controls the value of the power supply voltage to be supplied to the logic circuit 202 according to the power gating control signal PGC. For example, the power gating circuit 201 supplies a power supply voltage of 1.2 V to the logic circuit 202 when the power gating control signal PGC is brought to a voltage V1, and supplies a power supply voltage of 0.8 V to the logic circuit 202 when the power gating control signal PGC is brought to a voltage V2. Here, the voltage V2 is a voltage lower than the voltage V1. The voltages V1 and V2 are voltages higher than 0 V.

The clamp circuit 1003 with level shift function includes a clamp circuit and a level shift circuit. The clamp circuit 1003 clamps the logic signal SA according to the clamp control signal CCS and outputs the logic signal SB to the logic circuit 202. Specifically, the clamp circuit 1003 has an AND circuit which outputs the logical product signal SB of the logic signal SA and the clamp control signal CCS to the logic circuit 202. Further, the clamp circuit (level shift circuit) 1003 outputs to the logic circuit 202 the logic signal SB at a level different from that of the logic signal SA by shifting the level of the logic signal SA. For example, when the power gating circuit 201 supplies the power supply voltage of 0.8 V to the logic circuit 202, the logic signal SA has a high level of 1.2 V and a low level of 0 V, and the logic signal SB has a high level of 0.8 V and a low level of 0 V. In this case, the clamp circuit 1003 shifts the level from 1.2 V to 0.8 V.

The clamp circuit 1004 with level shift function includes a clamp circuit and a level shift circuit. The clamp circuit 1004 clamps the output logic signal SC from the logic circuit 202 according to the clamp control signal CCS and outputs the logic signal SD. Specifically, the clamp circuit 1004 has an AND circuit which outputs the logical product signal SD of the output logic signal SC from the logic circuit 202 and the clamp control signal CCS. Further, the clamp circuit (level shift circuit) 1004 outputs the logic signal SD at a level different from that of the output logic signal SC from the logic circuit 202 by shifting the level of the output logic signal SC from the logic circuit 202. For example, when the power gating circuit 201 supplies the power supply voltage of 0.8 V to the logic circuit 202, the logic signal SC has a high level of 0.8 V and a low level of 0 V, and the logic signal SD has a high level of 1.2 V and a low level of 0 V. In this case, the clamp circuit 1004 shifts the level from 0.8 V to 1.2 V.

A malfunction in FIG. 11 will be described. The power gating circuit 201 supplies the power supply voltage of 1.2 V to the logic circuit 202 when the power gating control signal PGC is at the voltage V1. Further, it is assumed that the power gating circuit 201 supplies a power supply voltage of, for example, 0.6 V to the logic circuit 202 when the power gating control signal PGC is at the voltage V2. Here, it is assumed that the logic circuit 202 has an operable voltage of, for example, 0.8 V or higher and its normal operation is not ensured at the power supply voltage of 0.6 V.

The voltages V1 and V2 are voltages higher than 0 V, and when the power gating circuit 201 is supplying the power supply voltage to the logic circuit 202, the clamp control signal CCS becomes high level. The logic signal SB becomes the same signal as the logic signal SA when the clamp control signal CCS is at high level.

When the power gating control signal PGC is at the voltage V1, the power supply voltage of 1.2 V is supplied to the logic circuit 202, so that the logic circuit 202 outputs a normal logic signal SC. In contrast, when the power gating control signal PGC is at the voltage V2, the power supply voltage of 0.6 V is supplied to the logic circuit 202, so that the logic circuit 202 does not perform the normal operation but outputs a logic signal SC having an unknown value at a timing 1101. The logic signal SD becomes the same signal as the logic signal SC when the clamp control signal CCS is at high level.

The unknown value of the logic signal SC propagates to the logic signal SD to cause a problem of occurrence of a malfunction in the circuit at the subsequent stage using the logic signal SD. The hardware emulator and FPGA cannot express such an unknown value, thus causing a problem of failure to detect the above-described malfunction.

As described above, in the case where the value of the power supply voltage to the circuit block is changed, a malfunction occurs if the power supply voltage is set to a voltage value outside the voltage range within which the logic circuit 202 is operable. In this case, in the case where the value of the power supply voltage to be supplied to the logic circuit 202 can be changed by an instruction from the power supply management unit 110, for example, if the value of the supplied power supply voltage is decreased to be lower than the power supply voltage at which circuit elements constituting the logic circuit 202 (a combinational circuit, a sequential circuit such as a flip-flop or the like, a memory circuit such as SRAM or the like, other analog circuits and so on) can operate, the logic signal SC outputted from the logic circuit 202 takes an unknown value to cause a malfunction in an actual circuit.

However, the hardware emulator and FPGA keep applying a fixed power supply voltage at all times to the circuits realizing the logic circuit 202 and therefore have a problem of failure to recognize the unknown value due to the decrease in the power supply voltage and detect a malfunction.

Figure 12:
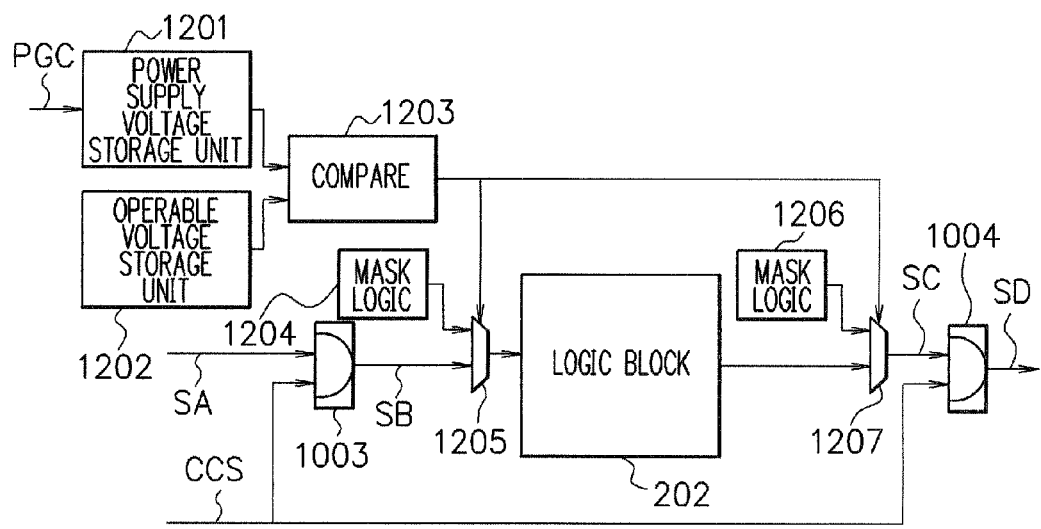
FIG. 12 is a circuit diagram illustrating a configuration example of a circuit block made by modifying the circuit block in FIG. 10 in order to enable verification by the hardware emulator or FPGA.

FIG. 12 is a circuit diagram illustrating a configuration example of a circuit block made by modifying the circuit block in FIG. 10 in order to enable verification by the hardware emulator or FPGA. FIG. 12 is made by omitting the power gating circuit 201 and adding a power supply voltage storage unit 1201, an operable voltage storage unit 1202, a comparison circuit 1203, mask logic circuits 1204 and 1206 and selectors 1205 and 1207 in place of the power gating circuit 201 with respect to the circuit block in FIG. 10. Hereinafter, points that FIG. 12 is different from FIG. 10 will be described.

The power supply voltage storage unit 1201 stores the power supply voltage value according to the power gating control signal PGC. For example, the power supply voltage is 1.2 V when the power gating control signal PGC is at the voltage V1, and the power supply voltage is 0.6 V when the power gating control signal PGC is at the voltage V2. The operable voltage storage unit 1202 stores the operable voltage of the logic circuit 202. For example, the operable voltage of the logic circuit 202 ranges from 0.8 V to 1.2 V. The comparison circuit 1203 compares whether or not the power supply voltage value stored in the power supply voltage storage unit 1201 is the operable voltage stored in the operable voltage storage unit 1202, and outputs a comparison result.

The mask logic circuits 1204 and 1206 output, for example, mask data fixed at high level.

The selector 1205 selects the mask data outputted from the mask logic circuit 1204 or the logic signal SB outputted from the clamp circuit 1003 according to the comparison result of the comparison circuit 1203, and outputs it to the logic circuit 202. In short, the selector 1205 is a mask circuit for masking the input signal to the logic circuit 202 according to the comparison result of the comparison circuit 1203.

The selector 1207 selects the mask data outputted from the mask logic circuit 1206 or the logic signal outputted from the logic circuit 202 according to the comparison result of the comparison circuit 1203, and outputs it as the logic signal SC to the clamp circuit 1004. In short, the selector 1207 is a mask circuit for masking the output signal from the logic circuit 202 according to the comparison result of the comparison circuit 1203.

Figure 13:
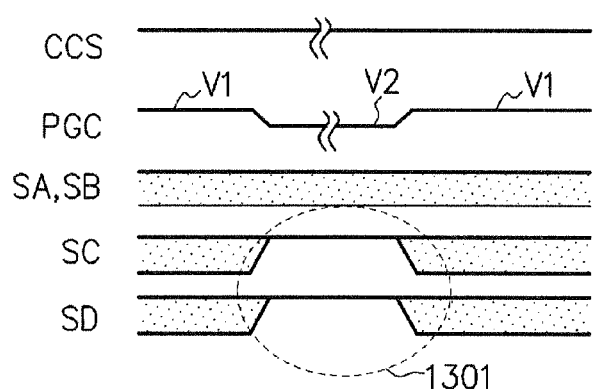
FIG. 13 is a timing chart for explaining a malfunction of the circuit block in FIG. 12.

FIG. 13 is a timing chart for explaining a malfunction of the circuit block in FIG. 12. The selector 1205 selects the output logic signal SB from the clamp circuit 1003 when the power supply voltage value is the operable voltage or selects the output mask data (for example, high level) from the mask logic circuit 1204 when the power supply voltage value is not the operable voltage, and outputs it to the logic circuit 202. The selector 1207 selects the output logic signal from the logic circuit 202 when the power supply voltage value is the operable voltage or selects the output mask data (for example, high level) from the mask logic circuit 1206 when the power supply voltage value is not the operable value, and outputs it to the clamp circuit 1004.

The clamp control signal CCS, the power gating control signal PGC and the logic signals SA and SB are the same as those in FIG. 11.

The logic signal SC becomes the same signal as the output logic signal from the logic circuit 202 when the power supply voltage value is the operable voltage or becomes the same signal as the mask data (for example, high level) when the power supply voltage value is not the operable voltage. In other words, the unknown value at the timing 1101 in FIG. 11 is expressed as the mask data (for example, high level) at a timing 1301 in FIG. 13.

The logic signal SD becomes the same signal as the logic signal SC when the clamp control signal CCS is at high level. The unknown value generated because the power supply voltage value is not the operable voltage is expressed as mask data, and the mask data is propagated from the logic signal SC to the logic signal SD, whereby a malfunction can be detected by the hardware emulator or FPGA.

As described above, the supplied power voltage value instructed from the power supply management unit 110 is stored in the power supply voltage storage unit (a flip-flop, a memory or the like) 1201, and the voltage (the minimum voltage value and/or the maximum voltage value) at which the logic circuit 202 is operable is stored in the operable voltage storage unit (a flip-flop, a memory or the like) 1202. The comparison circuit 1203 compares the supplied power supply voltage value and the operable voltage. As a result of the comparison, if the supplied power supply voltage is not the operable voltage, the selector 1205 outputs the mask data to the logic circuit 202, and the selector 1206 outputs the mask data to the clamp circuit 1004. As a matter of course, it is also possible that the comparison result output signal from the comparison circuit 1203 is used not as a select signal but directly as the mask data.

Thus, if the value of the supplied power supply voltage to the circuit block in the semiconductor chip is brought to an inappropriate value (an inoperable voltage value), the malfunction in such a case can be detected by the hardware emulator or FPGA by masking the output signal (or the input/output signal) from the logic circuit 202 by the mask data.

Note that the clamp circuits 1003 and 1004 with level shift function may be simple level shift circuits (without clamp function).

According to this embodiment, by generating the design data of the circuit block for verification, the operation in dynamic change of the power supply voltage can be verified. Further, the verification can be performed by the hardware emulator or FPGA, so that high-speed verification is possible.

(Fourth Embodiment)

FIG. 14 is a circuit diagram illustrating a configuration example of a circuit block according to a fourth embodiment, and illustrating a configuration example of a circuit block made by modifying the circuit block in FIG. 10 in order to enable verification by the hardware emulator or FPGA. This embodiment is made by combining the first to third embodiments. Hereinafter, points that FIG. 14 is different from FIG. 12 will be described.

An AND circuit 1403 outputs a logical product signal of a logic inverted signal of a comparison result signal from the comparison circuit 1203 and the power gating control signal PGC. The selectors 1205 and 1207 perform selection according to the output signal from the AND circuit 1403. Thus, the control by the first and third embodiments is possible.

Further, the configurations of the error condition detection circuits 801 to 803, the OR circuit 811 and the error storage unit 812 are the same as those in the second embodiment (FIG. 8). Thus, the control by the second embodiment is possible.

As described above, this embodiment is the one made by combining the first to third embodiments. In this case, the output signal (or the input/output signal) from the logic circuit 202 is masked when the power gating control signal PGC becomes low level to turn off the power supply or when the supplied power supply voltage falls outside the operable voltage range to bring the comparison result signal from the comparison circuit 1203 to high level.

Thus, when the power supply to the logic circuit 202 is turned off or when the supplied power supply voltage value is set to an inoperable voltage value, the mask data can be propagated to the logic signal SD, and the occurrence of a malfunction can be recognized by the error condition detection circuits 801 to 803, so that the verification of the power supply management control can be performed by the hardware emulator or FPGA.

Note that the clamp circuits 1003 and 1004 may be configured such that respective individual circuits of the level shift circuit and the clamp circuit are serially connected.

According to this embodiment, by generating the design data of the circuit block for verification, the operation in ON/OFF control and dynamic change of the power supply voltage can be verified. Further, the verification can be performed by the hardware emulator or FPGA, so that high-speed verification is possible.

(Fifth Embodiment)

Figure 15:
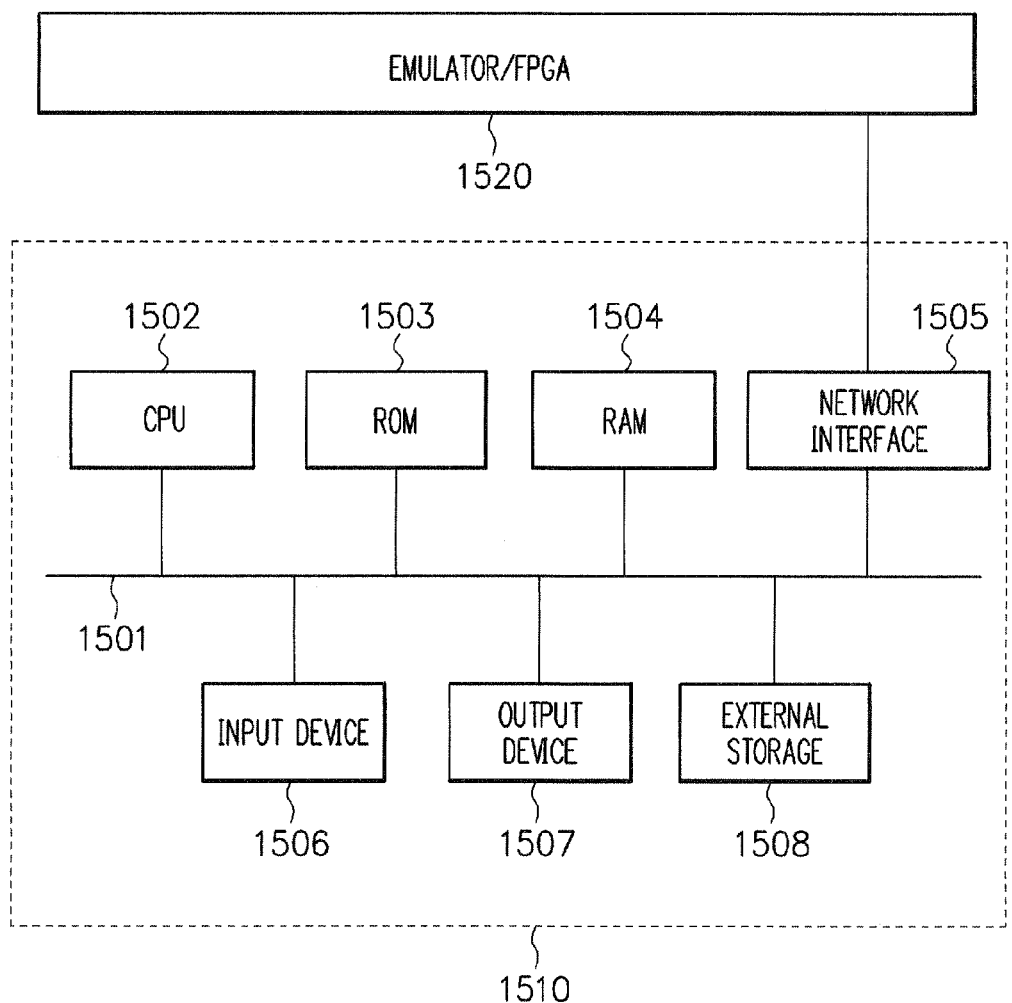
FIG. 15 is a block diagram illustrating a configuration example of hardware in a computer for realizing a designing method according to a fifth embodiment.

FIG. 15 is a block diagram illustrating a configuration example of hardware in a computer (designing apparatus) 1510 for realizing a designing method according to a fifth embodiment. The computer 1510 can be used to generate the design data of the circuit blocks for verification in the first to fourth embodiments.

To a bus 1501, a CPU 1502, a ROM 1503, a RAM 1504, a network interface 1505, an input device 1506, an output device 1507 and an external storage 1508 are connected.

The CPU 1502 performs processing or computation of data and controls various components connected thereto via the bus 1501. A control procedure (computer program) for the CPU 1502 is stored in the ROM 1503 in advance and started by executing the computer program by the CPU 1502. A computer program is stored in the external storage 1508, and the computer program is copied into the RAM 1504 and executed by the CPU 1502. The RAM 1504 is used as a work memory for inputting/outputting and transmitting/receiving data and a temporary storage for controlling the components. The external storage 1508 is, for example, a hard disk storage, a CD-ROM or the like, and its stored contents are not erased even if the power is turned off. The CPU 1502 executes the computer program in the RAM 1504 to thereby perform processing in FIG. 16 or FIG. 17 which will be described later so as to generate the design data of the circuit blocks in the first to fourth embodiments.

The network interface 1505 is an interface for connecting to a network and is connected to a hardware emulator or FPGA 1520. The computer 1510 can transmit the design data to the hardware emulator or FPGA 1520 via the network interface 1505. The input device 1506 is, for example, a keyboard, a mouse and the like and can perform various kinds of designation, input and so on. The output device 1507 is a display, a printer and so on.

Figure 16:
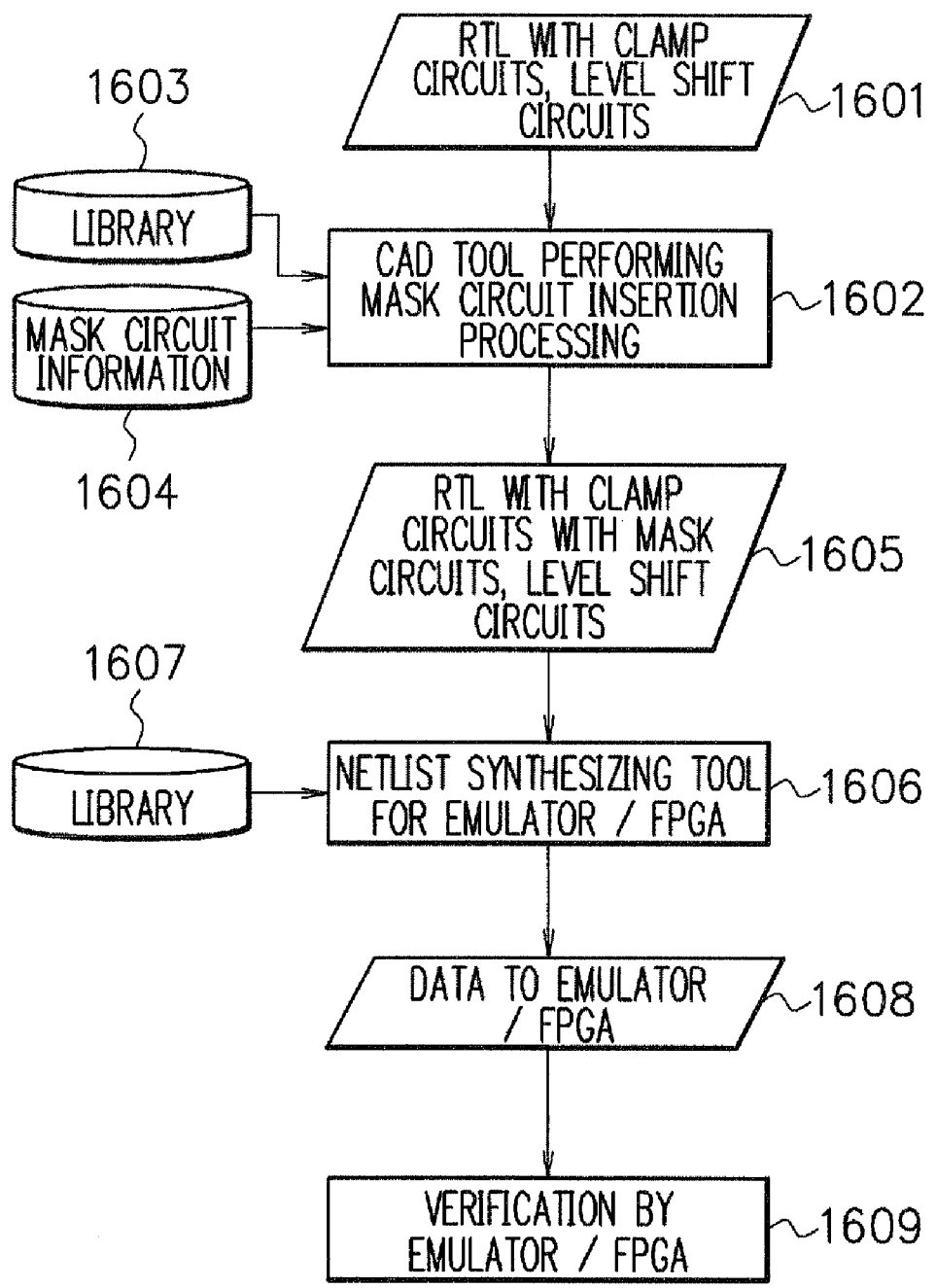
FIG. 16 is a flowchart illustrating a processing example of a program to be executed by the computer in FIG. 15.

FIG. 16 is a flowchart illustrating a processing example of the program executed by the computer 1510 in FIG. 15. The computer 1510 performs the following processing by executing the program.

First, at a step 1601, the computer 1510 prepares RTL (Register Transfer Level) design data of the circuit block including the clamp circuits 203 and 204 or the clamp circuits 1003 and 1004 with level shift function, and stores the RTL design data in the external storage 1508. In the first and second embodiments, the design data having the circuit block in FIG. 2 is prepared. In the third and fourth embodiments, the design data having the circuit block in FIG. 10 is prepared.

Then, at a step 1602, the computer 1510 generates, in order to verify the above-described RTL design data, RTL design data of the circuit block for verification based on the above-described RTL design data using a CAD (Computer-Aided Design) tool, a library 1603 and mask circuit information 1604. The library 1603 and the mask circuit information 1604 are stored in the external storage 1508. In the first embodiment, in order to verify the above-described RTL design data, RTL design data in which the mask circuit (including the mask logic circuits 501 and 503 and the selectors 502 and 504) is added in place of the power gating circuit 201 to the above-described RTL design data is generated. In the second embodiment, in order to verify the above-described RTL design data, RTL design data in which the error detection circuit (including the error condition detection circuits 801 to 803, the OR circuit 811 and the error storage unit 812) is added to the above-described RTL design data is generated. In the third embodiment, in order to verify the above-described RTL design data, RTL design data in which the power supply voltage storage unit 1201, the operable voltage storage unit 1202, the comparison circuit 1203 and the mask circuit (including the mask logic circuits 1204 and 1206 and the selectors 1205 and 1207) are added in place of the power gating circuit 201 to the above-described RTL design data is generated.

Then, at a step 1605, the computer 1510 writes the RTL design data generated at the step 1602 into the external storage 1508.

Then, at a step 1606, the computer 1510 generates netlist design data for the hardware emulator or FPGA 1520 based on the RTL design data generated at the step 1602 using a netlist synthesizing tool for the hardware emulator or FPGA 1520 and a library 1607. The library 1607 is stored in the external storage 1508.

Then, at a step 1608, the computer 1510 writes the netlist design data generated at the step 1606 into the external storage 1508, and transmits the netlist design data to the hardware emulator or FPGA 1520 via the network interface 1505.

Then, at a step 1609, the hardware emulator or FPGA 1520 receives the netlist design data from the computer 1510 and performs the operation verification. Since the netlist design data is generated such that a malfunction can be verified as described in the first to fourth embodiments, the hardware emulator or FPGA 1520 can verify the malfunction due to the design errors as illustrated in the first to fourth embodiments.

FIG. 17 is a flowchart illustrating a processing example of the program executed by the computer 1510 in FIG. 15. The computer 1510 performs the following processing by executing the program. In FIG. 16, an example has been illustrated in which the design data of the circuit block for verification is generated at the stage of the RTL design data. In FIG. 17, an example will be described in which the design data of the circuit block for verification is generated at the stage of the netlist design data.

First, at a step 1701, the computer 1510 prepares RTL design data of the circuit block before the clamp circuits 203 and 204 or the clamp circuits 1003 and 1004 with level shift function are provided, and stores the RTL design data in the external storage 1508. The RTL design data of the circuit block is the same as that at the step 1601 except that there are no clamp circuits 203 and 204 or the clamp circuits 1003 and 1004 with level shift function.

Then, at a step 1702, the computer 1510 generates netlist design data in which the clamp circuits 203 and 204 or the clamp circuits 1003 and 1004 with level shift function are added to the above-described RTL design data, using a logic synthesizing tool, a library 1703 and clamp circuit or level shift circuit information 1704. The library 1703 and the clamp circuit or level shift circuit information 1704 are stored in the external storage 1508.

Then, at a step 1705, the computer 1510 writes the netlist design data generated at the step 1702 into the external storage 1508.

Then, at a step 1706, the computer 1510 generates, in order to verify the above-described netlist design data, netlist design data of the circuit block for verification based on the above-described netlist design data using a CAD tool, a library 1707 and mask circuit information 1708. The library 1707 and the mask circuit information 1708 are stored in the external storage 1508. The step 1706 is the same as the step 1602 except that the netlist design data is generated in place of the RTL design data.

Then, at a step 1709, the computer 1510 writes the netlist design data generated at the step 1706 into the external storage 1508.

Then, at a step 1710, the computer 1510 generates netlist design data for the hardware emulator or FPGA 1520 based on the netlist design data generated at the step 1706 using the netlist synthesizing tool for the hardware emulator or FPGA 1520 and a library 1711. The library 1711 is stored in the external storage 1508.

Then, at a step 1712, the computer 1510 writes the netlist design data generated at the step 1710 into the external storage 1508, and transmits the netlist design data to the hardware emulator or FPGA 1520 via the network interface 1505.

Then, at a step 1713, the hardware emulator or FPGA 1520 receives the netlist design data from the computer 1510 and performs the operation verification. Since the netlist design data is generated such that a malfunction can be verified as described in the first to fourth embodiments, the hardware emulator or FPGA 1520 can verify the malfunction due to the design error as illustrated in the first to fourth embodiments.

This embodiment can be realized by the computer 1510 executing the program. Further, means for supplying the program to the computer, for example, a computer-readable recording medium such as a CD-ROM or the like recording the program thereon or a transmission medium such as the Internet or the like transmitting the program is also applicable as an embodiment. Further, a computer program product such as the above-described computer-readable recording medium or the like recording the program thereon is also applicable as an embodiment. The above-described program, recording medium, transmission medium and computer program product are included in the scope of the present invention. As the recording medium, for example, a flexible disk, a hard disk, an optical disk, a magneto-optic disk, a CD-ROM, a magnetic tape, a non-volatile memory card, a ROM and so on can be used.

As described above, in this embodiment, CAD processing is performed which automatically changes circuits from the clamp circuits 203 and 204 or the clamp circuits 1003 and 1004 with level shift function connected to the input/output signal of the circuit block, for example, to the circuits 1401 and 1402 in FIG. 14. This ensures that the power supply management verification is performed more simply and surely by the hardware emulator or FPGA 1520. Further, by automatically inserting the mask circuit or the like at the step 1602 or the step 1706, the verification by the hardware emulator or FPGA becomes possible with ease.

The malfunction when the power supply management control is performed (the control error of the control signal, the malfunction when the logic circuit accidentally decreases the power supply voltage to be lower than the operable voltage, or the like) can be verified by the hardware emulator or FPGA at a high speed.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A designing method of a semiconductor integrated circuit, the method comprising:
   preparing first design data including a power gating circuit to supply a power supply voltage to a logic circuit according to a power gating control signal and a first clamp circuit to clamp an output signal from the logic circuit according to a clamp control signal; and
   generating, using a computer, in order to verify the first design data, second design data in which a first mask circuit to mask the output signal from the logic circuit according to the power gating control signal is added in place of the power gating circuit to the first design data.

2. The designing method of a semiconductor integrated circuit according to claim 1,
wherein the first mask circuit includes a first selector to select the output signal from the logic circuit or mask data according to the power gating control signal and to output the output signal or the mask data to the first clamp circuit.

3. The designing method of a semiconductor integrated circuit according to claim 1,
wherein the first clamp circuit includes a first AND circuit to output a logical product signal of the output signal from the logic circuit and the clamp control signal.

4. The designing method of a semiconductor integrated circuit according to claim 1, further comprising:
preparing design data including a second clamp circuit to clamp a first logic signal according to the clamp control signal and to output the first logic signal to the logic circuit.

5. The designing method of a semiconductor integrated circuit according to claim 4, further comprising:
generating design data in which a second mask circuit to mask an input signal to the logic circuit according to the power gating control signal is added.

6. The designing method of a semiconductor integrated circuit according to claim 5,
wherein the second mask circuit includes a second selector to select the output signal from the second clamp circuit or mask data according to the power gating control signal and to output the output signal or the mask data to the logic circuit.

7. The designing method of a semiconductor integrated circuit according to claim 4,
wherein the second clamp circuit includes a second AND circuit to output a logical product signal of the first logic signal and the clamp control signal.

8. The designing method of a semiconductor integrated circuit according to claim 1, further comprising:
verifying an operation by a hardware emulator or FPGA (Field Programmable Gate Array) based on the design data generated at the generating design data.

9. A designing method of a semiconductor integrated circuit, the method comprising:
preparing first design data including a power gating circuit to supply a power supply voltage to a logic circuit according to a power gating control signal and a first clamp circuit to clamp an output signal from the logic circuit according to a clamp control signal; and
generating, using a computer, in order to verify the first design data, second design data in which an error detection circuit to detect an error based on the power gating control signal and the clamp control signal is added to the first design data.

10. The designing method of a semiconductor integrated circuit according to claim 9,
wherein the first clamp circuit includes a first AND circuit to output a logical product signal of the output signal from the logic circuit and the clamp control signal.

11. The designing method of a semiconductor integrated circuit according to claim 9, further comprising:
preparing design data including a second clamp circuit to clamp a first logic signal according to the clamp control signal to output the first logic signal to the logic circuit.

12. The designing method of a semiconductor integrated circuit according to claim 11,
wherein the second clamp circuit includes a second AND circuit output a logical product signal of the first logic signal and the clamp control signal.

13. The designing method of a semiconductor integrated circuit according to claim 9, further comprising:
verifying an operation by a hardware emulator or FPGA (Field Programmable Gate Array) based on the design data generated at the generating design data.

14. A designing method of a semiconductor integrated circuit, the method comprising:
preparing first design data including a power gating circuit to control a value of a power supply voltage to be supplied to a logic circuit according to a power gating control signal and a first level shift circuit to output a signal at a level different from a level of an output signal from the logic circuit by shifting the level of the output signal from the logic circuit; and
generating, using a computer, in order to verify the first design data, second design data in which a comparison circuit to compare whether or not the value of the power supply voltage according to the power gating control signal is an operable voltage and a first mask circuit to mask the output signal from the logic circuit according to a comparison result of the comparison circuit are added in place of the power gating circuit to the first design data.

15. The designing method of a semiconductor integrated circuit according to claim 14, further comprising:
preparing design data including a first clamp circuit to clamp the output signal from the logic circuit according to a clamp control signal.

16. The designing method of a semiconductor integrated circuit according to claim 15,
wherein the first clamp circuit includes a first AND circuit to output a logical product signal of the output signal from the logic circuit and the clamp control signal.

17. The designing method of a semiconductor integrated circuit according to claim 14,
wherein the first mask circuit includes a first selector to select the output signal from the logic circuit or mask data according to the comparison result of the comparison circuit and to output the output signal or the mask data to the first level shift circuit.

18. The designing method of a semiconductor integrated circuit according to claim 14, further comprising:
preparing design data including a second level shift circuit to output a signal at a level different from a level of the first logic signal by shifting the level of the first logic signal to the logic circuit.

19. The designing method of a semiconductor integrated circuit according to claim 18, further comprising:
generating design data in which a second mask circuit to mask an input signal to the logic circuit according to the comparison result of the comparison circuit is added.

20. The designing method of a semiconductor integrated circuit according to claim 14, further comprising:
verifying an operation by a hardware emulator or FPGA (Field Programmable Gate Array) based on the design data generated at the generating design data.

* * * * *